United States Patent [19]
Berkovich

[11] Patent Number: 4,856,130
[45] Date of Patent: Aug. 15, 1989

[54] DEVICE FOR ROCKING A BABY CARRIAGE

[76] Inventor: Shlomo Berkovich, Tor Hazahav St. 10/22, Herzlia, Israel

[21] Appl. No.: 288,941

[22] Filed: Dec. 23, 1988

Related U.S. Application Data

[63] Continuation of Ser. No. 63,829, Jun. 19, 1987, abandoned.

[30] Foreign Application Priority Data

Jun. 20, 1986 [IL]  Israel ........................................ 75591

[51] Int. Cl.⁴ ............................ A47D 9/02; B62B 9/22
[52] U.S. Cl. ........................................ 5/109; 128/36
[58] Field of Search ........................... 5/105, 108, 109; 128/32, 34, 35, 36, 37; 600/26, 27, 28

[56] References Cited

U.S. PATENT DOCUMENTS

| | | | |
|---|---|---|---|
| 2,523,547 | 9/1950 | Zerkle | 128/36 |
| 2,664,575 | 1/1954 | Lee | 5/109 |
| 2,668,302 | 2/1954 | Dengrove | 5/109 |
| 2,915,057 | 12/1959 | Ammon | 128/33 |
| 3,031,686 | 5/1962 | Muzzey | 5/109 |
| 3,261,033 | 7/1966 | Martin | 5/109 |
| 3,494,353 | 2/1970 | Marich | 128/36 |
| 3,952,343 | 4/1976 | Wong | 5/109 |
| 3,992,731 | 11/1976 | Carswell | 5/109 |
| 4,430,992 | 2/1984 | Christ | 128/34 |
| 4,681,096 | 7/1987 | Cuervo | 600/27 |

FOREIGN PATENT DOCUMENTS

| | | | |
|---|---|---|---|
| 548918 | 11/1957 | Canada | 5/109 |
| 1021502 | 11/1977 | Canada | 5/108 |
| 7328559 | 6/1985 | China . | |
| 2541935 | of 0000 | Fed. Rep. of Germany . | |
| 2581881 | 11/1986 | France . | |
| 1320891 | 6/1970 | United Kingdom . | |
| 1221089 | 3/1971 | United Kingdom | 128/33 |
| 1451981 | 10/1976 | United Kingdom | 5/108 |
| 2132080 | 7/1984 | United Kingdom . | |
| 8603108 | 6/1986 | World Int. Prop. O. | 5/109 |

Primary Examiner—Gary L. Smith
Assistant Examiner—Eric K. Nicholson

[57]  ABSTRACT

A compact, portable rocking device for baby carriages and the like including a box-like housing arranged to be attached to a wall of the carriage; a circular, horizontally disposed plate disposed in the housing, an integral arm extending outwardly horizontally from the plate; a weight disposed on the arm; a miniature DC motor mounted in the housing coupled via transmission apparatus to the plate for rotation thereof; a switch for actuating and stopping the motor; and electronic apparatus for automatically activating the switch.

7 Claims, 3 Drawing Sheets

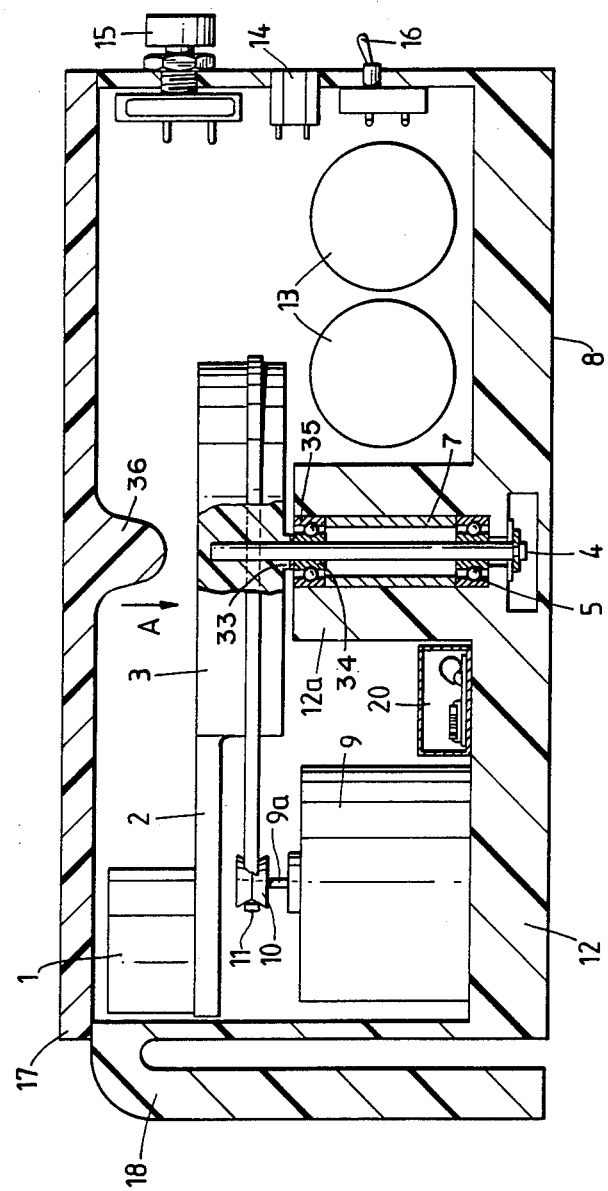
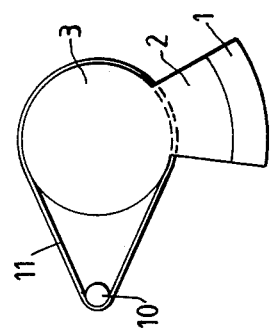
Fig.1.
Fig.2.

DEVICE FOR ROCKING A BABY CARRIAGE

This is a continuation of copending application Ser. No. 63,829, filed June 19, 1987.

FIELD OF THE INVENTION

The present invention concerns a device for automatic rocking of baby carriages, cribs, playpens, chairs and the like, hereinafter, for the sake of convenience, collectively called carriages.

BACKGROUND OF THE INVENTION

Manual rocking of carriages is bothersome, tiring and time-consuming. In order to solve this problem, a variety of mechanical rocking devices have been developed and are known in the patent literature.

U.S. Pat. No. 2,649,167 to Strom, for example, discloses a spring motor for rotating a centrifugal weight adapted to be attached to a crib, chair, playpen or the like, in order to impart thereto a vertical rocking or oscillating motion.

U.S. Pat. No. 2,916,745 to Lesk discloses a mechanism for affixing under the mattress of a crib including an electric motor power drive means and arm construction for rotating an eccentrically disposed weight.

U.S. Pat. No. 3,311,935 to Petty discloses a bed vibrating device including a vertically mounted eccentrical weight arranged to be secured to the grid springs of the crib and impart a vertical motion thereto. The motor rotating the weight must be an AC motor which operates on the wall current.

U.S. Pat. No. 2,980,108 to Scott discloses a pulsating mattress including a spring assembly which is caused to vibrate by a motor driving a shaft having an eccentrically mounted weight thereon.

Similarly, U.S. Pat. No. 3,934,283 to Raffel discloses a device for connecting to any bed frame including two vibratory motors which produce interfering vibratory waves to set up differential vibrations in the bed frame.

U.S. Pat. No. 2,805,427 to Edgmon discloses a crib having means for providing longitudinal motion thereto comprising a crib bottom supporting plate and eccentric weight means to vibrate the plate.

All of these devices require manual activation and stopping. Each is relatively large and heavy and requires a large quantity of energy (which is generally supplied by the wall current). In each, except Lesk, the motor produces vertical vibration of the crib or the like.

SUMMARY OF THE INVENTION

It is an object of the present invention to provide automatic rocking means which are easily mountable on baby carriages, cribs, playpens, chairs and the like, to rock them when desired, at any desired amplitude, either continuously or intermittently.

It is a further object of the invention to provide an automtic rocking device for carriages, which is very small and, thus, easily portable, can be attached to the carriage when desired and is operable by batteries.

It is a still further object of the invention to provide an automatic rocking device for carriages which is inexpensive to manufacture, safe in use, and which is very efficient, thus requiring a very small energy input.

These and further objects are attained by the present invention which consists in a rocking device for baby carriages and the like which comprises a circular, horizontally disposed plate from which an integral arm extends outwardly, said arm carrying a weight, the said plate being rotated by means of a miniature DC motor as hereinafter specified, through the intermediary of suitable transmission means, the said parts being arranged in a box-like housing adapted to be mounted on a wall of the carriage, a switch being provided to actuate or stop the operation of the motor, and means for automatic operation of the switch.

According to a preferred embodiment of the invention, the motor is driven by batteries. According to an alternate embodiment, the motor is driven by the network current with the interposition of a suitable transformer.

The transmission devices may comprise a belt and pulley, gears, or any other suitable transmission means.

According to a preferred embodiment of the invention, a potentiometer is provided mounted in the housing for changing the speed of the motor.

BRIEF DESCRIPTION OF THE DRAWINGS

The present invention will be further understood and appreciated from the following detailed description taken in conjunction with the drawings in which:

FIG. 1 is a schematic illustration of a device for rocking a carriage constructed and operative in accordance with an embodiment of the present invention, shown in vertical section;

FIG. 2 is a partial view of FIG. 1, taken in the direction of arrow A therein;

DETAILED DESCRIPTION OF THE INVENTION

Figure 3:
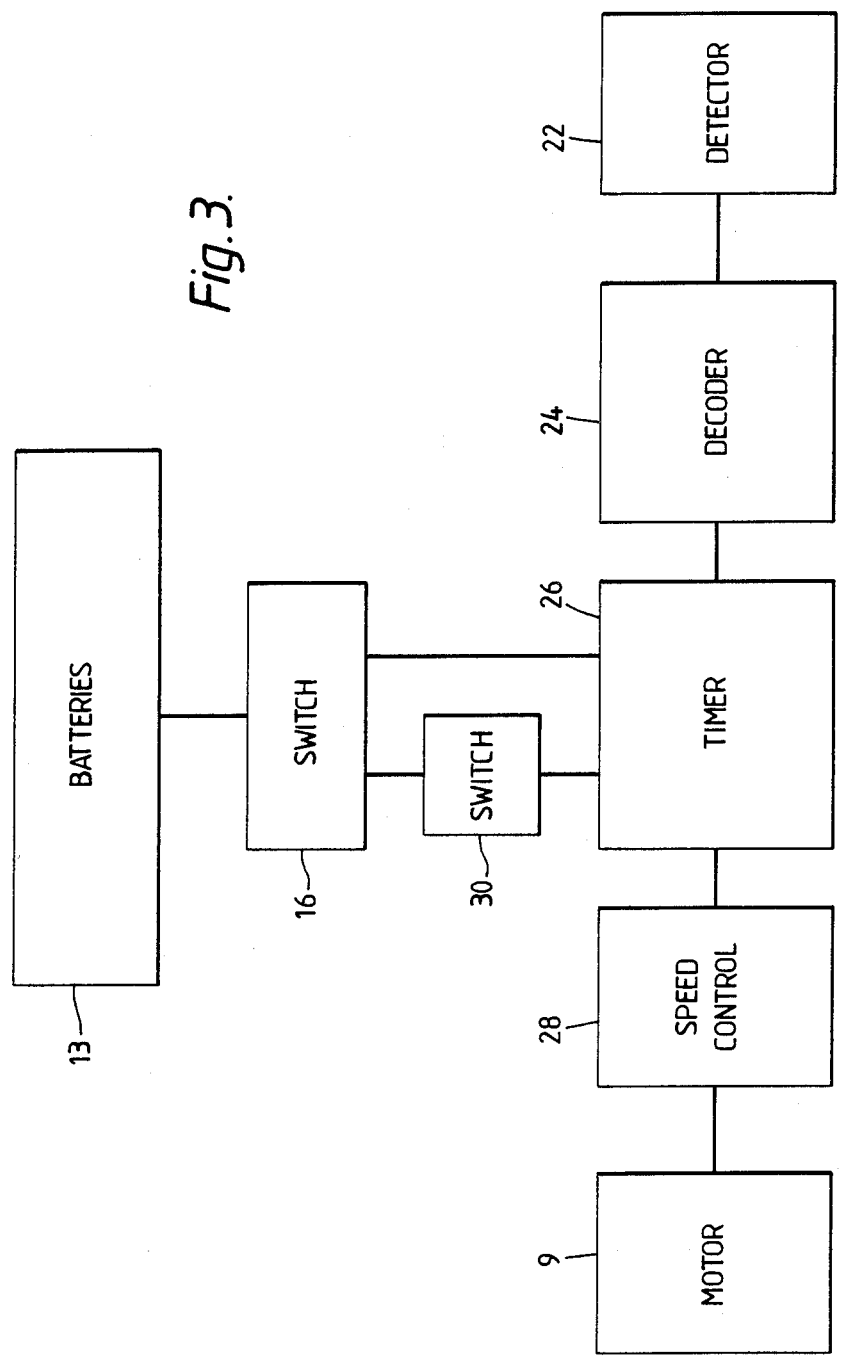
FIG. 3 is a block diagram of the electronic circuit for automatic actuation of the device of the present invention.
Figure 4:
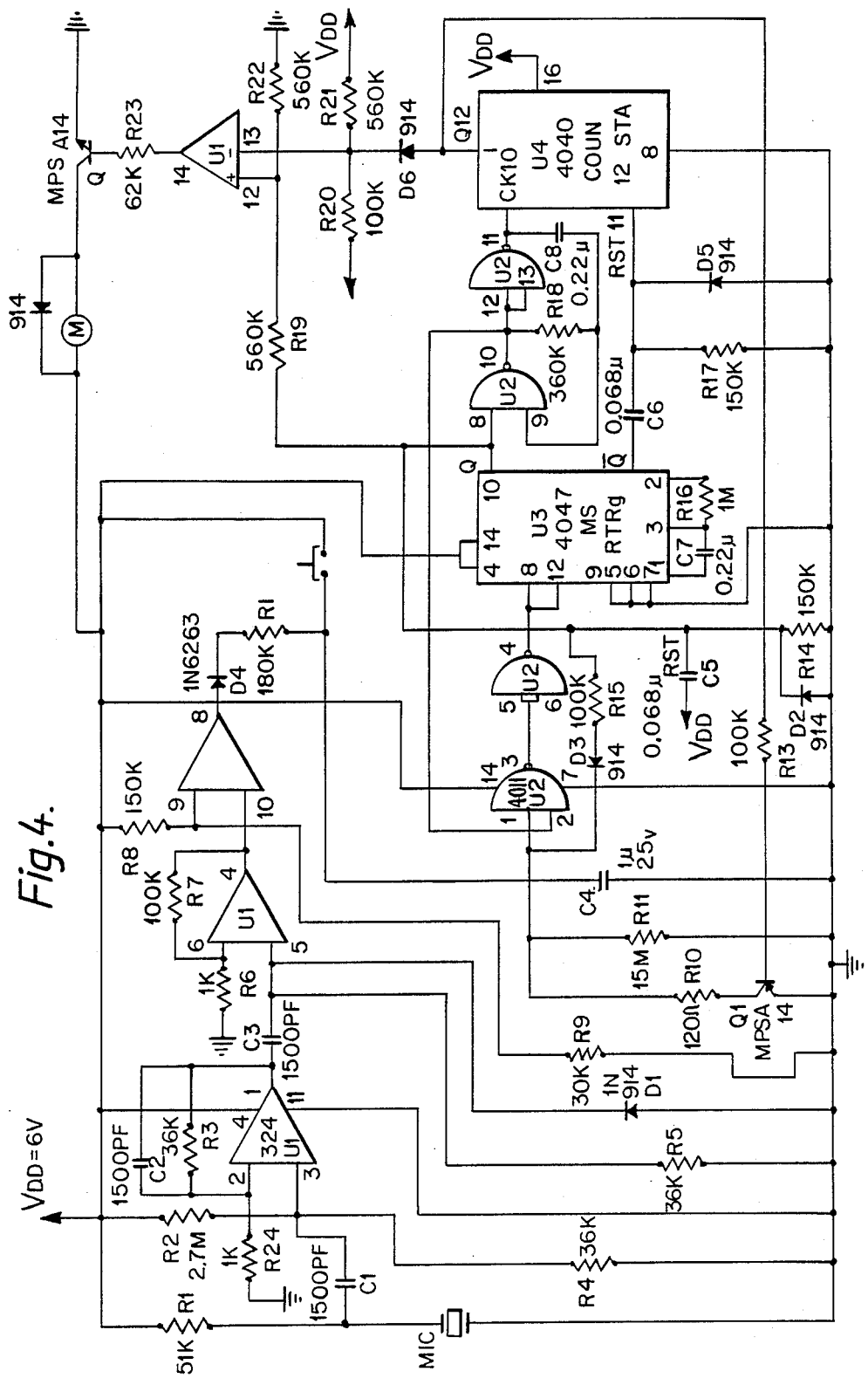
FIG. 4 is a circuit diagram of one embodiment of the electronic circuit for actuating the rocking device.

The present invention relates to a device for automatic rocking of a baby carriage, crib or the like. The device is small, operating on a miniature motor, and due to the particular arrangement of the various elements, is extremely efficient in use. In other words, a very small energy input is required to initiate and maintain the rocking motion, so the device is operable over an extended period of time on batteries. A device of this size and efficiency is not known or suggested among conventional crib rockers.

With reference to FIGS. 1 and 2, there is shown a rocking device for carriages and the like constructed and operative in accordance with the present invention and comprising a generally box-like housing 8. Mounted for rotation in housing 8 is a horizontally disposed, circular plate 3. An integral arm 2 extends horizontally outwardly from plate 3 and a weight 1 is supported on its outer end.

Plate 3 is mounted on a vertical shaft 4 rotatable in bearings 5 housed in a sleeve 7. Bearings 5 may comprise ball bearings, roller bearings, friction bearings or the like. It is a particular feature of the present invention that bearings operative to lower the friction as much as possible are utilized, to increase the efficiency of the mechanism and lower the required energy input. Pursuant thereto, and as illustrated in FIG. 1, it is preferred that the plate 3 include an integral depending axial sleeve 33 which encircles shaft 4 and seats solely on the inner race 34 of a ball bearing assembly wherein the ball bearings are retained between the inner race 34 and a fixed outer race 35.

Shaft 4 is inserted in a post 12a integral with and extending from the base 12 of housing 8 and is prevented from falling out or excessive vertical shifting relative to post 12a by means of a depending protrusion 36 on the inner surface of removable lid 17 of the housing axially aligned over plate 3 and shaft 4. This can allow avoidance of the use of more restrictive friction-generating means to retain the shaft.

Plate 3 is rotated by a DC motor 9 disposed on the base 12 through the intermediary of transmission means. The DC motor 9 is one of 6 V to 12 V, and uses between 50 and 200 milliampere. Preferably, motor 9 comprises a 6 V, 100 milliampere motor. Motor 9 is preferably driven by two or four 3 V batteries 13 disposed on base 12. Alternatively, the motor may be driven by the current network, in which case, a female plug 14 may be mounted in the wall of the housing. Plug 14 is arranged for the connection of a male plug to supply power to the motor from the current network with the interposition of a suitable rectifier (not shown).

In the illustrated embodiment, the transmission means from the motor 9 to plate 3 includes a belt 11 driven by a pulley 10 mounted on the vertically extending shaft 9a of motor 9. The transmission ratio of the diameter of plate 3 to that of pulley 10 may be chosen for convenience, but is preferably 8:1. Alternatively, the transmission means may comprise gears, friction wheels, or any other suitable means.

An integral flange 18 extends downwardly from the top of one side of housing 8 forming a hook-like arrangement adapted to be slid over the top of the wall of a carriage (not shown). Alternately, flange 18 may be replaced by any other means which permit the attachment of housing 8 to a carriage, either in a permanent or readily removable manner.

A switch 16 is provided in another wall of the housing to start or stop the motor. If it is desired to change the force of the rocking movement, a potentiometer 15 of 30 to 100 ohm is mounted in said wall to control the speed of the motor by changing the current supply thereto.

It will be appreciated that the circuit wiring diagram of the device has not been shown, since it is an obvious one to those skilled in the art after reading the description of the parts of the device.

Most of the parts above described, such as housing 8, plate 3 and cover 17, are preferably made of plastic which, on the one hand, is lightweight and, on the other, provides insulation, making the device safe in use and inexpensive to manufacture.

It will be appreciated that the length of arm 2 and the size and shape of weight 1 depend on the overall size of the rocking device, as well as the particular motor and transmission means for rotating the plate 3. Accordingly to a preferred embodiment, wherein the rocking device is particularly compact and lightweight, housing 8 is a plastic square housing of 160 mm by 160 mm, 80 mm high, a miniature 6 V motor is utilized weighing about 50 grams, weight 1 weighs 500 grams and is relatively long and flat, and the transmission ratio is 8:1. This embodiment is capable of functioning continuously on two 3 V batteries for 48 hours, depending, of course, on the type of battery utilized.

Operation of the rocking device is as follows. When power is supplied to motor 9, plate 3 is rotated by means of belt 11. The eccentrically disposed weight 1 on arm 2 will cause the entire mechanism, together with the housing 8, to oscillate at an even frequency, causing the center of gravity of the carriage on which the housing is mounted to shift back and forth so that a rocking motion of the carriage results.

Referring now to FIG. 3, there is shown a block diagram of an electronic actuating mechanism 20 for automatic operation of the rocking device. Actuating mechanism 20 comprises detecting means 22 for detecting the cry or movement of a baby in the carriage which might necessitate operation of the rocking mechanism, decoder means 24 for determining that the cry or movement detected by detecting means 22 meets the predetermined characteristics for activation of the rocking mechanism, and a timer 26 to fix the duration of the rocking operation. A speed controller 28 may be interposed between the timer and the motor to permit control of the amplitude or force of the desired rocking.

Detector means 22 may comprise a voice detector comprising a microphone of any suitable kind, preferably capacitative. The voice detector is activated upon reception of voice waves within a specific frequency and amplitude range when located, for example, 1.5 meters from the baby. Thus, miscellaneous background noises will not trigger detector 22.

Alternatively, detector means 22 may comprise a movement detector, as known per se, which detects mechanical vibration of the carriage. Thus, if the baby moves sufficiently to vibrate the carriage, a contact weight, or any other means, generates an electric pulse which is provided to decoder 24.

Decoder 24 serves to determine that the detected cry or movement is of the correst type to activate the rocking device. It includes means for measuring the frequency of the cry or amplitude of the vibrations and a timing device which measures the duration of the detected signal. If the duration is longer than a pre-programmed threshold, i.e., 8 seconds, timer 26 is triggered and power is supplied to the motor, activating the rocking device which begins rocking.

Timer 26 is preset for the desired duration of rocking, i.e., five minutes. When timer 26 reaches the preset time, it cuts off the flow of electricity to the motor, thereby stopping its operation. The rocking mechanism is then ready for activation once again upon detection of the baby's cry or movement.

The electronic logic of mechanism 20 preferably comprises CMOS components.

It will be appreciated that the switch 16 serves to turn the power supply on and off. The automatic mechanism 20 permits three stages of operation. First, manual actuation is possible by actuating internal switch 30 which triggers timer 26. Second, when the power is on but the rocking mechanism is not operating, the mechanism is in the Stand-By mode. In this mode, it can be activated either manually by switch 30, or automatically by means of detector 22.

It will be appreciated by those skilled in the art that the invention is not limited to what has been shown and described hereinabove by way of example. Rather, the scope of the invention is limited solely by the claims which follow.

I claim:

1. A compact, portable rocking device for baby carriages, cribs, playpens and chairs comprising:
   a box-like housing mountable to a wall of a carriage, crib, playpen or chair;
   a hollow vertical support post in said housing, a vertical shaft, low friction bearing means mounted in said support post and rotatably receiving said shaft, said bearing means comprising a fixed outer bearing race and a rotatable inner race with low friction bearings therebetween, a circular, horizontally disposed plate overlying, affixed to and axially receiving said shaft, an axial sleeve integral with said plate and depending therefrom in encircling relation about said shaft, said sleeve seating solely on said inner race and maintaining said plate in vertically spaced relation above said bearing means and said support post;

a weight disposed on said plate and eccentric relative to said shaft;

a miniature 6 volt DC motor drawing up to 200 milliamp of current mounted in said housing, and low friction belt transmission means coupling said motor to said plate for rotation thereof;

a switch for actuating and stopping the motor; and electronic means for automatically activating said switch.

2. A portable rocking device as in claim 1 wherein said low friction bearings are ball bearings.

3. A portable rocking device as in claim 2 including a removable housing lid overlying said plate, said lid including a depending protrusion axially aligned over said plate and vertically spaced thereabove for precluding excess vertical shifting of said plate and the affixed shaft while allowing unencumbered rotation of the plate and shaft.

4. A portable rocking device in claim 1 including a removable housing lid overlying said plate, said lid including a depending protrusion axially aligned over said plate and vertically spaced thereabove for precluding excess vertical shifting of said plate and the affixed shaft while allowing unencumbered rotation of the plate and shaft.

5. A device as claimed in claim 1, wherein said electronic means comprises:

detector means arranged to provide an output signal upon detecting activity of a baby in said carriage;

decoder means arranged to receive said output signal and to determine whether it meets predetermined criteria for activating said motor, and to provide a triggering signal if it does; and a timer coupled to said motor for activation thereof and arranged to be triggered by said triggering signal.

6. A device as claimed in claim 5 and further comprising a manual switch coupled to said timer for manual triggering of said timer.

7. A device as claimed in claim 5 and further comprising a speed controller coupled between said timer and said motor for controlling the speed of the motor.

* * * * *